United States Patent Office 3,521,571
Patented July 21, 1970

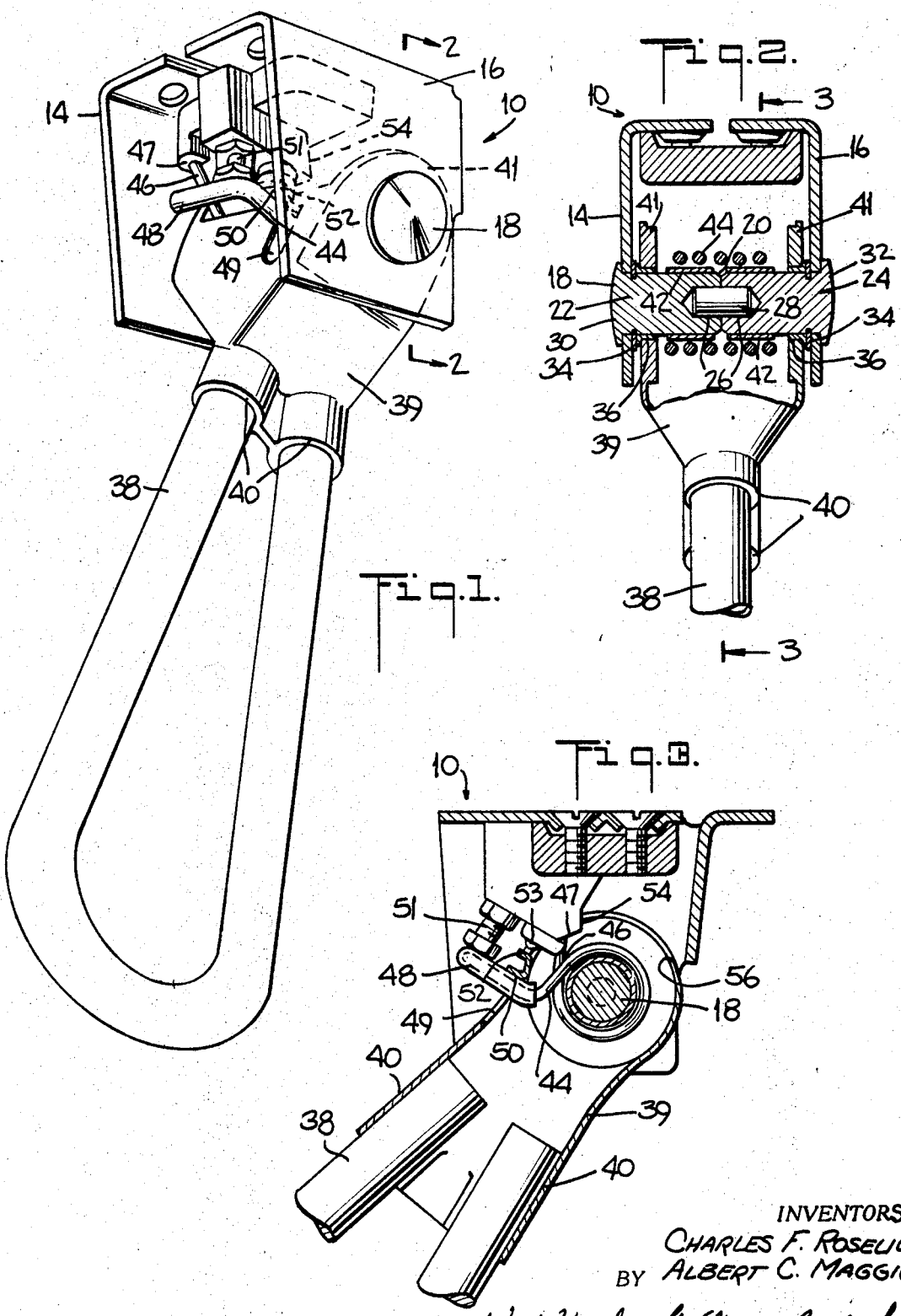

3,521,571
HAND HOLD
Charles F. Roselius, Kinnelon, N.J., and Albert C. Maggio, Brooklyn, N.Y., assignors to Ellcon National, Inc., Totowa Borough, N.J., a corporation of New York
Filed Jan. 30, 1968, Ser. No. 701,676
Int. Cl. B61d *37/00, 49/00*
U.S. Cl. 105—354                                                 7 Claims

ABSTRACT OF THE DISCLOSURE

A hand hold assembly including a bracket carrying an axle made in two removably connected parts, each having an external overlapping head; and a handle mounted on the axle for pivotal movement.

---

This invention relates to a hand hold assembly and more particularly to a new and improved hand hold assembly which is particularly adapted, among other possible uses, for use on subway cars such as are operated in New York city. Heretofore, hand hold assemblies have been employed which were not entirely satisfactory from the standpoint of withstanding vandalism. That is, vandals were prone to pry the hand hold assemblies from their mounting brackets. Also, the prior art hand hold assemblies were not satisfactory in certain esthetic aspects. Oil tended to leak out from around the mounting bracket bushings providing an "eye-sore" for subway riders. An object of this invention is to overcome these prior art problems.

Briefly, this invention contemplates the provision of a hand hold assembly including a supporting bracket having two depending legs. A transversely split axle is mounted on the legs and extends therebetween, and means are provided for removably interconnecting the two portions of the axle. Means are carried by the outer ends of each axle portion for engaging the outside surfaces of the legs respectively, and retainer means are carried by each of the axles for engaging the inside surfaces of the legs, respectively. Provision is made for a handle and means are provided for mounting the handle on the axle inwardly of the aforementioned retainer means.

In one form of the invention, the means for removably interconnecting the two portions of the axle include a pin for inserting in a longitudinally extending bore positioned at the adjacent ends of the two portions of the axle, the pin having a press fit in the bore in each portion of the axle, thereby to hold the two portions together. Further, according to one form of the invention, the handle has as a hub portion provided with two depending spaced arms which are mounted on the axle, and a return spring is surmounted on the axle between the spaced arms. One end of the return spring is in engagement with the supporting bracket for urging the handle toward its initial at-rest position.

There has thus been outlined rather broadly the more important features of the invention in order that the detailed description thereof that follows may be better understood, and in order that the present contribution to the art may be better appreciated. There are, of course, additional features of the invention that will be described hereinafter that will form the subject of the claims appended hereto. Those skilled in the art will appreciate that the construction on which this disclosure is based may readily be utilized as the basis for the design of other structures for carrying out the several purposes of the invention. It is important, therefore, that the claims be regarded as including such equivalent constructions as do not depart from the spirit and scope of the invention. One embodiment of the invention has been chosen for purposes of illustration and description, and is shown in the accompanying drawings, forming a part of the specification, wherein:

FIG. 1 is a perspective view of a hand hold assembly constructed according to the concept of this invention;

FIG. 2 is a transverse sectional view taken along the line indicated at 2—2 of FIG. 1 and showing details of the internal components of the hand hold assembly; and FIG. 3 is a sectional view taken along the line 3—3 in FIG. 2.

In the embodiment of the invention illustrated, the hand hold assembly includes a support bracket indicated generally at 10 and having two depending legs 14 and 16. An axle 18 is mounted on these legs and extends therebetween. This axle is medially split as at 20, FIG. 2, to form two symmetrical portions 22 and 24. As best seen in FIG. 2, each portion is provided with a longitudinally extending bore 26 for receiving a pin 28 with a press fit, thereby removably interlocking the two portions together. The term "press fit" is well-known in the trade and indicates that a pin having a diameter slightly larger than the diameter of the receiving bore, is forced into the bore.

The outside ends of the portions 22 and 24 of the axle are provided with external overlapping heads 30 and 32 for engaging the outside surfaces of the legs 14 and 16, respectively. As best seen in FIG. 2, a pair of retainer rings 34 are carried by the axle 18. That is, one ring is removably mounted on each portion (22, 24) of the axle for engaging the inside surface of the legs (14, 16), respectively. A pair of handle bushings 36 are also carried by the axle 18, one being mounted on each portion (22, 24) of the axle in a position inwardly with respect to the retainer rings 34, respectively. A generally U-shaped handle 38 is employed, the ends of which are connected to a hub portion 39, as at 40. The hub portion 39 is provided with two depending arms 41, which are mounted on the handle bushings 36, respectively, whereby the handle 38 is arcuately pivotable in a manner which will be described more fully hereinafter.

The hand hold assembly further comprises a pair of return spring bushings 42, one being mounted on each axle portion (22, 24) in an inward position with respect to the handle bushings 36, respectively. A return spring 44 is surmounted on the return spring bushings 42. As best seen in FIG. 3, one end portion 46 of the return spring 44 is permanently fixedly anchored in the support bracket 10 as at 47. The other end portion 48 of the return spring 44 passes outwardly through an opening 49 in the hub portion 39 and is engageable with a protuberance 50 extending from the hub portion 39 adjacent said opening 49. Also, the end portion 48 of the return spring 44 is engageable with an adjusting or set screw 51 carried by the support bracket 10. The set screw 51 is adjustable so that the end portion 48 substantially simultaneously engages the protuberance 50 and the set screw 51 when the handle 38 is in its initial or at-rest position. Also, the set screw 51 is used to align the position of the handle 38 with respect to other handles in the car. A stop member 52 extends from the hub portion 39 for engaging a small resilient stop button 53 carried by the support bracket 10 to limit the arcuate travel of the handle 38 with respect to the support bracket 10. A further feature of the invention resides in the provision of means for limiting the arcuate travel of the handle 38 in the opposite direction with respect to the support bracket 10. This is effected by the provision of a stop element 54 on the support bracket which is engaged by a surface portion 56 of the handle 38.

In operation the handle 38 rests in a slightly inclined position of the order of about 30° with respect to the vertical axis. In this initial or at-rest position, as shown in FIGS. 1 and 3, the end portion 48 of the return spring 44 simultaneously engages the protuberance 50 and the set screw 51. When the handle 38 is pivoted in a counterclockwise direction, as viewed in FIGS. 1 and 3, the protuberance 50 engages the end portion 48 to urge the end portion also in a counterclockwise direction against the resiliency of the return spring 44. At this time the end portion 48 is not in engagement with the set screw 51. When the handle 38 is released the end portion 48 of the return spring returns the handle to its initial at-rest position due to the resiliency of the spring. When the handle 38 is pivoted in a clockwise direction, as viewed in FIGS. 1 and 3, the end portion 48 remains in engagement with the set screw 51, but the end portion becomes disengaged from the protuberance 50, thereby releasing the resilient force of the return spring 44. Upon further rotation of the handle 38 in a clockwise direction, as viewed in FIGS. 1 and 3, the stop member 52 will engage the stop button 53, and thereby positively prevent further rotation of the handle. Upon release of the handle, gravity rotates the handle in a counterclockwise direction until the handle returns to its initial at-rest position.

In order to disassemble the hand hold assembly, the retaining rings 34 are removed. Then a pressure tool is inserted between the two return spring bushings 42 to force the axle apart along the slit 20 beyond the grip of the pin 28. The return spring 44 and the return spring bushings 42 can then be readily lifted out. In order to assemble the hand hold assembly, the foregoing steps are taken in the reverse order. It will be appreciated that a vandal cannot insert a sharp pointed instrument, such as a screwdriver, between the depending arms 41 of the handle and the legs of the supporting bracket for purposes of removing the axle from the supporting bracket. Also, it will be appreciated that the external overlapping head 30 of the axle 18 provides a pleasing appearance and is void of oil seepage between the axle and the supporting bracket. It will thus be seen that the present invention does indeed provide an improved hand hold assembly which is superior in simplicity, economy and efficiency as compared to prior art such devices.

Although a particular embodiment of the invention is herein disclosed for purposes of explanation, various modifications thereof, after study of the specification, will be apparent to those skilled in the art to which the invention pertains.

What is claimed and desired to be secured by Letters Patent is:

1. A hand hold assembly comprising a support bracket having two depending legs, a transversely split axle mounted on said legs and extending therebetween, means for removably interconnecting the two portions of said axle, overlapping heads integral with the outer end of each portion of said axle for engaging the outside surfaces of said legs respectively, retainer rings carried in slots in each portion of the axle for engaging the inside surfaces of said legs respectively, a handle, and means mounting said handle on said axle inwardly of said retainer means.

2. A hand hold assembly according to claim 1 wherein said means for removably interconnecting the two portions of said axle comprises a pin, a longitudinally extending bore positioned at the adjacent ends of the two portions for receiving said pin, whereby each portion of said axle receives part of said pin, said pin having a press fit in said bore.

3. A hand hold assembly according to claim 1, further comprising a pair of handle bushings mounted on the axle and which are disposed inwardly of said retainer rings respectively, and wherein said handle has a hub portion provided with two depending spaced arms, said spaced arms being carried by said handle bushings, respectively.

4. A hand hold assembly according to claim 3 further comprising a pair of return spring bushings, one being mounted on each portion of the axle inwardly of said handle bushings, a return spring surmounted on said return spring bushings with one end anchored in said support bracket and the other end in engagement with said handle for urging said handle toward its initial at-rest position.

5. A hand hold assembly according to claim 1 further comprising a return spring mounted on said axle and having one end thereof anchored in said support bracket, said handle having a hub portion which has an opening through which the other end of said return spring passes, a protuberance extending from the hub portion adjacent said opening, a set screw carried by said support bracket, said other end of said return spring substantially simultaneously engaging said protuberance and said set screw when the handle is in its initial at-rest position, said other end of said return spring engaging said protuberance and being disengaged from said set screw when the handle is pivoted in a first direction, and said other end of said return spring engaging said set screw and being disengaged from said protuberance when the handle is pivoted in a second opposite direction.

6. A hand hold assembly according to claim 5 further comprising a stop button carried by said support bracket, and a stop member extending from said hub portion for engaging said stop button to limit the arcuate travel of said handle with respect to said support bracket when said handle is pivoted in said second direction.

7. A hand hold assembly comprising a U-shaped support bracket having two depending legs, a medially split axle mounted on said legs and extending therebetween, pin means interconnecting the two portions of the axle, the outer ends of said portions of said axle having external overlapping heads for engaging the outside surfaces of said legs respectively, retainer rings carried by each of said portions of the axle for engaging the inside surfaces of said legs respectively, a pair of handle bushings mounted on said axle, said bushings being disposed inwardly of said retainer rings respectively, a handle having a hub portion provided with two depending spaced arms, said spaced arms being carried by said handle bushings respectively, a pair of return spring bushings, one being mounted on each axle portion in an inward position with respect to said handle bushings, a return spring surmounted on said return spring bushings with one end anchored in said support bracket, said hub portion having an opening through which the other end of said return spring passes, a protuberance extending from the hub portion adjacent said opening, a set screw carried by said support bracket, said other end of said return spring substantially simultaneously engaging said protuberance and said set screw when the handle is in its initial at-rest position, said other end of said return spring engaging said protuberance and being disengaged from said set screw when the handle is pivoted in a first direction, and said other end of said return spring engaging said set screw and being disengaged from said protuberance when the handle is pivoted in a second opposite direction, a stop button carried by said support bracket, and a stop member extending from said hub portion for engaging said stop button to limit the arcuate travel of said handle with respect to said support bracket when said handle is pivoted in said second direction.

References Cited

UNITED STATES PATENTS

| | | | |
|---|---|---|---|
| 1,373,746 | 4/1921 | Lewis et al. | 105—354 |
| 1,650,429 | 11/1927 | Clark | 105—354 |
| 2,137,622 | 11/1938 | Munro et al. | 105—354 |
| 2,222,950 | 11/1940 | Itzcovitz et al. | 105—354 |
| 2,547,483 | 4/1951 | Mersereav | 105—354 |
| 2,672,103 | 3/1954 | Hohmes | 105—354 |

ARTHUR L. LA POINT, Primary Examiner

R. A. BERTSCH, Assistant Examiner